United States Patent [19]

Clunis

[11] 3,820,701

[45] June 28, 1974

[54] DIFFERENTIAL TAPE DRIVE

[75] Inventor: Kenneth Clunis, Stillwater, Minn.

[73] Assignee: Minnesota Mining and Manufacturing Company, St. Paul, Minn.

[22] Filed: Apr. 23, 1973

[21] Appl. No.: 353,382

[52] U.S. Cl. .................................. 226/183, 226/187

[51] Int. Cl. ............................................. B65h 17/22

[58] Field of Search ........... 226/181, 182, 183, 176, 226/186, 187

[56] References Cited

UNITED STATES PATENTS

| | | | |
|---|---|---|---|
| 2,499,699 | 3/1950 | Tinkham | 226/183 |
| 3,001,733 | 9/1961 | Axon et al. | 226/181 X |
| 3,093,284 | 6/1963 | Mullin | 226/176 |

*Primary Examiner*—M. Henson Wood, Jr.
*Assistant Examiner*—Gene A. Church
*Attorney, Agent, or Firm*—Alexander, Sell, Steldt & DeLaHunt

[57] ABSTRACT

A differential tape drive comprising a hard surfaced capstan, a hard surfaced idler roller having a diameter greater than that of the capstan and a resilient surfaced transfer roller forced into contact with the capstan and the idler roller. The transfer roller is driven by the capstan and drives the idler roller to tension a length of magnetic tape extending from the nip between the idler roller and the transfer roller to the nip between the capstan and the transfer roller.

4 Claims, 3 Drawing Figures

DIFFERENTIAL TAPE DRIVE

FIELD OF THE INVENTION

The present invention relates to a tape drive utilizing three contacting rollers to create a velocity difference and thereby tension in a length of magnetic tape.

BACKGROUND OF THE INVENTION

High quality tape recording and reproducing requires that the magnetic tape travel past the magnetic transducer in the reproducing mode exactly as it did in the recording mode. Fluctuations in the speed of the travel of the tape past the transducer result in distortion of the signals by frequency modulation and departure of the tape from the predetermined path of travel causes signal distortion by phase displacement.

In a typical tape recording and reproducing system some type of driving mechanism receives the tape under appreciable tension from a supply reel, moves the tape past the magnetic transducer under a predetermined tension and then delivers the tape to a take-up reel which again places the tape under appreciable tension. Since both of the reels place the tape under tension, irregularities in the travel of the tape past the transducer commonly originate in the two reels. A fully loaded reel is both bulky and heavy and must rotate at a peripheral speed of many feet per second and, therefore, high magnitudes of angular momentum of the two reels are obtained which emphasize the unavoidable eccentricities of the wound-up tape.

The portion of the tape moving past the magnetic transducer has been isolated from the irregularities otherwise induced by the reels by forming an isolated tape loop under tension. The loop is isolated from the reels by three rollers, a central roller and a roller to each side contacting the central roller. The tape passes from the supply reel between one of the side rollers and the central roller, is formed into a loop past the magnetic transducer and then passes between the central roller and the other side roller to the take-up reel. To place the loop under tension, the tape going into the loop must be driven at one speed and the tape leaving the loop at a slightly higher speed with consequent elongation of the tape in the loop. The difference in speed is achieved in the mechanism disclosed in U.S. Pat. No. 3,093,284 by forcing the two side rollers against the central deformable capstan with different pressures. In U.S. Pat. No. 2,913,192 the difference is achieved by driving the ingoing and outgoing portions of the tape at different radii of the central drive capstan.

SUMMARY OF THE INVENTION

The present invention provides a differential tape drive comprising a hard surfaced capstan, a hard surfaced idler roller and resilient surfaced transfer roller. The hard surfaced idler roller is supported for rotation about an axis spaced from and parallel to the axis of the capstan and it has a diameter greater than that of the capstan. The resilient surfaced transfer roller is supported for free rotation about an axis spaced from and parallel to the axis of the capstan and the idler and it has a diameter greater than the spacing between the capstan and the idler roller. A force of a predetermined magnitude is applied at the axis of the transfer roller and perpendicular to a line joining the axis of the capstan on the idler roller to urge the transfer roller into engagement with the capstan and the idler roller. A tape loop from the nip between the idler roller and the transfer roller past a magnetic transducer to the nip between the transfer roller and the capstan is thus isolated from the tape reels. And, the speed of pulling the tape through the loop is precisely controlled by the hard surfaced capstan.

DESCRIPTION OF THE PREFERRED EMBODIMENT

Figure 1:
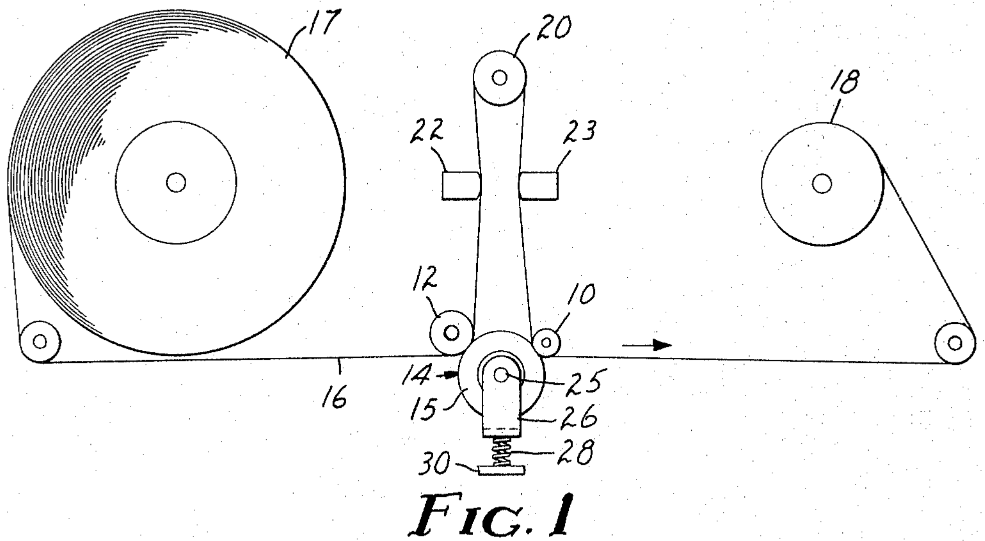
FIG. 1 is a plan view of a tape recorder incorporating the differential tape drive of the present invention.
Figure 2:
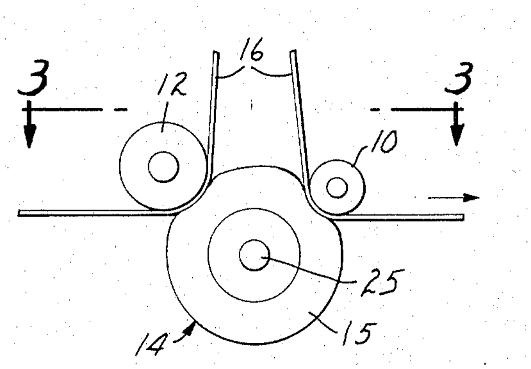
FIG. 2 is a plan view of a portion of the apparatus of FIG. 1.
Figure 3:
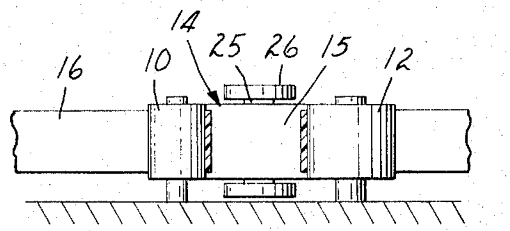
FIG. 3 is an elevation view of the portion of the tape recorder illustrated in FIG. 2.

The differential tape drive of the present invention comprises a hard-surfaced capstan 10, a hard-surfaced idler roller 12 having a diameter greater than that of the capstan and a resilient surfaced transfer roller 14 forced into contact with the capstan and the idler roller. It is illustrated in FIG. 1 in its intended use driving a length of magnetic tape 16 from a supply reel 17 to a take-up reel 18. The magnetic tape path 16 from the nip between the hard-surfaced idler roller 12 and the transfer roller 14 to the nip between the transfer roller 14 and the capstan 10 is formed into a loop around a guide pulley 20. A magnetic erase head 22 and a recording head 23 are positioned along the opposed legs of the loop as is conventional.

The transfer roller 14 is preferrably formed with a peripheral annulus 15 of a material having a durometer between 55 and 65 to provide firm tape drive while permitting differential deformation by the capstan 10 and the idler 12 to produce tension in the tape loop as described hereinafter. The transfer roller 14 is supported for rotation on a shaft 25 the ends of which are supported in a U-shaped bracket 26. A compression spring 28 is captured between the bracket 26 and a stationary projection 30 to apply a predetermined force at the axis of the transfer roller in a direction perpendicular to the axis of the transfer roller and bisecting the angle formed at the intersection of a plane through the axes of the capstan and the transfer roller and a plane through the axes of the idler and the transfer roller to urge the transfer roller with equal force into engagement with the capstan and the idler roller. The use of a single compression spring 28 permits the transfer roller 14 to float so that it is self-aligning with the capstan 10 and the idler roller 12, i.e. its periphery is free to and because of the force applied to it does align with the peripheries of the capstan and the idler roller. This feature enhances the design by eliminating the cost of holding close manufacturing tolerances on the alignment of the transfer roller with the capstan and the idler.

In use, the capstan 10 is driven in a counterclockwise direction (as viewed in FIG. 1) at a constant speed by a drive motor (not shown). The capstan 10 drives the magnetic tape against the transfer roller 14 at the tangential velocity of the capstan itself. If there is no slippage between the capstan and the transfer roller 14, the transfer roller at its contact with the capstan has a tangential velocity equal to that of the capstan. However, since the transfer roller 14 is forced into engagement with the capstan 10 its periphery is deformed slightly by the capstan. And, because the same volume of transfer roller material must pass through a restriction at the capstan as at the undeformed positions the tangential velocity of the transfer roller 14 along the undeformed portions thereof is less than its tangential velocity in the area of contact with the capstan.

The transfer roller 14 drives the hard-surfaced idler 12 and the magnetic tape in the nip between the transfer roller 14, the magnetic tape 16 being driven at the tangential velocity of the hard-surfaced idler 12. Since the idler 12 also deforms the periphery of the transfer roller 14 its tangential velocity will be greater than that of the undeformed portions of the transfer roller 14. However, since the idler 12 has a diameter greater than that of the capstan 10 it will cause a lesser radial deformation of the transfer roller 14 than does the capstan and, therefore, it will travel at a lesser tangential velocity than does the capstan. Since the tape driven between the idler 12 and the transfer roller 14 is driven at a slower speed into the loop than the tape pulled out of the loop at the nip between the transfer roller 14 and the capstan 10 tension will be introduced into the tape in the loop.

The ratio of the radial deformations of the transfer roller 14 by the capstan 10 and the hard-surfaced idler 12 is inversely related to the diameters of the capstan and the idler. Thus, the speed differential between the capstan 10 and the idler 12 and the tension in the tape loop may be changed as desired by changing the ratio of the diameters of the capstan 10 and the idler 12. It may also be changed by changing the predetermined force with which the transfer roller 14 is pressed against the capstan 10 and the idler 12; increased transfer roller force causing increased tape tension.

It has been found in practice that a tape tension of approximately 1 pound per inch of tape width and mil of tape thickness is preferred. With the usual acetate or polyester magnetic tape backings the desired tension is or is nearly obtained when the tangential velocity differential between the capstan 10 and the hard-surfaced idler 12 is in the range from 0.25 percent to 0.5 percent of the tangential velocity of the capstan.

In one specific embodiment of the present invention the capstan 10 had a 0.375 inch diameter, the transfer roller 14 has a 2 inch diameter and was formed of a urethane having a durometer of about 60, and the idler roller 12 had a diameter of 0.75 inch. The capstan 10, the transfer roller 14 and the idler 12 each had an axial height of one inch. A 0.25 inch wide magnetic tape having a one mil thick polyester backing was driven at 15 inches per second and the force on the transfer roller 14 was varied to change the deformations thereof and thereby to change the tape tension. It was found that a tape tension of about 2 to 3 ounces was preferred and that the force on the transfer roller to obtain those tensions was from 13 to 37 ounces, the tape tension being approximately a linear function of the transfer roller force in this range. The deformation of the transfer roller 14 at the capstan 10 for a 16 ounce force on the transfer roller was 0.001 inch and at the idler roller 12 the deformation was 0.0015 inch. In the preferred range of tape tensions the deformation at each location was approximately a linear function of the force applied to the transfer roller.

I claim:

1. A differential tape drive comprising:
- a hard surfaced capstan,
- a hard surfaced idler roller supported for free rotation about an axis spaced from and parallel to the axis of said capstan, said idler roller having a diameter greater than that of said capstan,
- a resilient surfaced transfer roller supported for free rotation about an axis spaced from and parallel to the axis of said capstan and said idler, said transfer roller having a diameter greater than the spacing between said capstan and said idler roller, and
- means for applying a force of a predetermined magnitude at the axis of said transfer roller to urge said transfer roller with equal force into engagement with said capstan and said idler roller.

2. The differential tape drive of claim 1 wherein said resilient surface of said transfer roller has a durometer in the range from 55 to 65.

3. The differential tape drive of claim 2 wherein said capstan and said idler roller engage the same axial height of said transfer roller and wherein said predetermined magnitude force is from 13 to 37 ounces per inch of axial engaging height of said transfer roller with said capstan and said idler roller.

4. The differential tape drive of claim 1 wherein said transfer roller is self-aligning with said capstan and said idler roller.

* * * * *